US012228273B2

(12) United States Patent
Huang et al.

(10) Patent No.: US 12,228,273 B2
(45) Date of Patent: Feb. 18, 2025

(54) LIGHTING APPARATUS

(71) Applicant: LEEDARSON LIGHTING CO., LTD., Fujian (CN)

(72) Inventors: Huiyong Huang, Fujian (CN); Zhengyu Tang, Fujian (CN); Shuxing Gao, Fujian (CN)

(73) Assignee: LEEDARSON LIGHTING CO., LTD., Fujian (CN)

(*) Notice: Subject to any disclaimer, the term of this patent is extended or adjusted under 35 U.S.C. 154(b) by 0 days.

(21) Appl. No.: 18/514,128

(22) Filed: Nov. 20, 2023

(65) Prior Publication Data

US 2024/0167673 A1 May 23, 2024

(30) Foreign Application Priority Data

Nov. 18, 2022 (CN) ......................... 202223074838.4

(51) Int. Cl.

| | |
|---|---|
| ***F21V 25/12*** | (2006.01) |
| ***F21S 8/02*** | (2006.01) |
| ***F21S 9/02*** | (2006.01) |
| ***F21V 21/04*** | (2006.01) |
| ***F21V 23/00*** | (2015.01) |
| ***F21V 25/02*** | (2006.01) |

(Continued)

(52) U.S. Cl.

CPC .............. *F21V 25/12* (2013.01); *F21S 8/026* (2013.01); *F21S 9/022* (2013.01); *F21V 21/045* (2013.01); *F21V 23/002* (2013.01); *F21V 23/006* (2013.01); *F21V 25/02* (2013.01); *H05B 47/19* (2020.01); *F21Y 2105/18* (2016.08); *F21Y 2115/10* (2016.08)

(58) Field of Classification Search

CPC ......... F21S 9/022; F21S 8/026; F21V 23/002; F21V 23/006; F21V 21/045; F21V 21/02; F21V 25/12; F21V 25/125; F21V 23/008; F21V 23/06; F21V 19/003; F21V 19/0035; F21V 19/00; F21V 25/02; F21V 212/045; F21V 212/02; H05B 27/19; H05B 47/19; F21Y 2105/18; F21Y 2115/10

See application file for complete search history.

(56) References Cited

U.S. PATENT DOCUMENTS

2003/0223240 A1* 12/2003 Houle ..................... F21V 21/04 362/396
2019/0063701 A1* 2/2019 Lotfi ..................... F21V 23/026

(Continued)

*Primary Examiner* — Erin Kryukova
(74) *Attorney, Agent, or Firm* — Chun-Ming Shih; LANWAY IPR SERVICES

(57) ABSTRACT

A lighting apparatus includes a light source, a light housing, a light passing cover and a connector module. The light source includes multiple LED modules. The light housing has an internal container and a light opening. The light source is placed inside the internal container. A light of the multiple LED modules escapes from the light opening. At least a portion of light housing is made with a plastic material mixed with an anti-fire material. The anti-fire material increases a melting temperature for deformation of the light housing. The light passing cover covers the light opening. The connector module has a fixing connector and an elastic unit. The fixing connector is fixed to the light passing cover. The elastic unit is used for fastening the light housing to an installation platform when no external force is applied on the elastic unit.

19 Claims, 7 Drawing Sheets

(51) Int. Cl.

| | |
|---|---|
| ***F21Y 105/18*** | (2016.01) |
| ***F21Y 115/10*** | (2016.01) |
| ***H05B 47/19*** | (2020.01) |

(56) References Cited

U.S. PATENT DOCUMENTS

| | | | | |
|---|---|---|---|---|
| 2020/0335049 | A1* | 10/2020 | Kumar | H05B 45/24 |
| 2020/0340659 | A1* | 10/2020 | Huang | G08B 17/06 |
| 2021/0025556 | A1* | 1/2021 | Luo | F21V 25/125 |
| 2021/0170209 | A1* | 6/2021 | Luo | F21V 25/125 |
| 2021/0254812 | A1* | 8/2021 | Danesh | F21V 15/01 |
| 2022/0082244 | A1* | 3/2022 | Lupien | F21V 25/12 |
| 2022/0214037 | A1* | 7/2022 | Huang | F21V 3/02 |
| 2022/0325858 | A1* | 10/2022 | Ruan | F21V 21/042 |

* cited by examiner

LIGHTING APPARATUS

FIELD

The present invention is related to a lighting apparatus, and more particularly related to a lighting apparatus with a robust structural strength with low cost material.

BACKGROUND

The evolution of lighting technology has been a fascinating journey through human history. From the early use of fire and candles to the advent of electric lighting, our quest for better and more efficient sources of light has never ceased. In recent decades, the development of LED (Light Emitting Diode) technology has revolutionized the world of lighting, offering a myriad of benefits and possibilities in various applications.

LED technology was born in the 1960s and has since come a long way. Initially, LEDs were used as indicator lights in electronic devices, but their potential for illumination was soon realized. Unlike traditional incandescent bulbs, LEDs emit light when an electric current passes through a semiconductor material. This fundamental difference led to a host of advantages, including energy efficiency, longevity, and design flexibility.

One of the most significant advantages of LED technology is its exceptional energy efficiency. LEDs convert a higher percentage of electrical energy into visible light, reducing energy consumption compared to traditional lighting sources. This efficiency not only saves electricity but also contributes to environmental sustainability by reducing carbon emissions.

LEDs have a much longer operational life compared to incandescent and fluorescent lights. The absence of fragile filaments or gases that can degrade over time means that LEDs can last for tens of thousands of hours. This longevity not only reduces the frequency of replacement but also lowers maintenance costs in various applications.

The versatility of LED technology has transformed the design of light devices. LEDs come in various colors and can be easily controlled to produce different levels of brightness and color temperatures. This flexibility has enabled designers to create innovative lighting solutions, from energy-efficient residential lighting to dynamic architectural lighting installations and even advanced automotive lighting systems.

Today, LED technology finds applications in almost every aspect of our lives. It illuminates our homes, offices, and streets, and it is used in display screens, traffic signals, and even medical devices. The adoption of LEDs continues to grow as we explore new ways to harness their benefits, making LED technology an integral part of our modern world and driving ongoing innovation in light device design. As technology continues to advance, we can expect even more exciting developments in the world of lighting.

When designing light devices, it's crucial to factor in the potential for fire accidents. While modern lighting technologies like LEDs are known for their energy efficiency and longevity, they are not immune to overheating and electrical faults, which can lead to fire hazards. Understanding and mitigating these risks is paramount to ensuring the safety of users and properties.

LEDs, like all electronic components, generate heat during operation. If not managed properly, this heat can accumulate and lead to device malfunction or even fire. Designing effective heat dissipation mechanisms, such as heat sinks or thermal conductive materials, is essential to prevent excessive heat build-up within the light device.

Utilizing fire-resistant materials in the construction of light devices is a critical step in fire prevention. Flame-retardant plastics and fire-resistant coatings can help delay the onset of a fire in case of a malfunction. These materials provide valuable time for users to detect the issue and take appropriate action before the situation escalates.

Light devices should be equipped with automatic safety features to detect overheating or electrical faults. These features can include temperature sensors, current limiters, and circuit breakers that activate when abnormal conditions are detected. By interrupting the electrical supply or reducing power output, these safeguards can prevent a minor issue from escalating into a major fire hazard.

In critical applications like industrial or commercial lighting, incorporating emergency shutdown mechanisms can be vital. These mechanisms can be activated remotely or automatically in response to fire alarms or abnormal temperature readings. They ensure that the light device is immediately powered down in case of a fire, minimizing the risk of further damage or injury.

Finally, light device manufacturers should subject their products to rigorous testing and certification processes to ensure they meet industry safety standards. Regulatory agencies often establish guidelines for fire safety in electrical devices. Compliance with these standards is not only a legal requirement but also a guarantee of product safety. By considering fire accidents and implementing these preventive measures, light device designers can contribute to safer and more reliable lighting solutions for all applications.

Light devices are an integral part of our daily lives, from the moment we wake up to when we go to sleep. They illuminate our homes, workplaces, streets, and countless other spaces. Given their ubiquitous presence, even minor improvements in light devices can have far-reaching impacts on our quality of life.

Designers are constantly driven to enhance the efficiency of light devices. This involves improving energy efficiency to reduce electricity consumption, thereby lowering utility bills and reducing our carbon footprint. LED technology, for instance, is a result of this relentless pursuit, offering a significantly more efficient alternative to traditional lighting sources.

Lighting isn't just about illumination; it's also about creating the right ambiance and mood. Designers understand that small refinements in light quality, color rendering, and dimming capabilities can greatly enhance the user experience. The ability to tailor lighting to specific needs, whether it's for relaxation, concentration, or aesthetics, contributes to our well-being and comfort.

Improvements in light devices extend beyond residential settings. In workplaces, hospitals, and public spaces, better lighting can enhance safety and productivity. High-quality lighting can reduce the risk of accidents, improve visibility, and create more conducive environments for work and recovery. Even subtle advancements in light technology can translate into significant improvements in these critical areas.

As society places a growing emphasis on sustainability, designers are also focused on making light devices more eco-friendly. From using recyclable materials in construction to designing fixtures that are easily upgradable and repairable, these sustainability-focused improvements not only benefit the environment but also promote responsible consumption.

In conclusion, designers are driven by the realization that even small improvements in light devices can yield substantial advantages for human life. Their relentless pursuit of efficiency, user experience enhancements, safety, productivity, and sustainability ensures that light devices continue to evolve, bringing about positive changes in how we illuminate our world and ultimately improving our overall quality of life. The evolution of lighting technology has been a fascinating journey through human history. From the early use of fire and candles to the advent of electric lighting, our quest for better and more efficient sources of light has never ceased. In recent decades, the development of LED (Light Emitting Diode) technology has revolutionized the world of lighting, offering a myriad of benefits and possibilities in various applications.

LED technology was born in the 1960s and has since come a long way. Initially, LEDs were used as indicator lights in electronic devices, but their potential for illumination was soon realized. Unlike traditional incandescent bulbs, LEDs emit light when an electric current passes through a semiconductor material. This fundamental difference led to a host of advantages, including energy efficiency, longevity, and design flexibility.

One of the most significant advantages of LED technology is its exceptional energy efficiency. LEDs convert a higher percentage of electrical energy into visible light, reducing energy consumption compared to traditional lighting sources. This efficiency not only saves electricity but also contributes to environmental sustainability by reducing carbon emissions.

LEDs have a much longer operational life compared to incandescent and fluorescent lights. The absence of fragile filaments or gases that can degrade over time means that LEDs can last for tens of thousands of hours. This longevity not only reduces the frequency of replacement but also lowers maintenance costs in various applications.

The versatility of LED technology has transformed the design of light devices. LEDs come in various colors and can be easily controlled to produce different levels of brightness and color temperatures. This flexibility has enabled designers to create innovative lighting solutions, from energy-efficient residential lighting to dynamic architectural lighting installations and even advanced automotive lighting systems.

Today, LED technology finds applications in almost every aspect of our lives. It illuminates our homes, offices, and streets, and it is used in display screens, traffic signals, and even medical devices. The adoption of LEDs continues to grow as we explore new ways to harness their benefits, making LED technology an integral part of our modern world and driving ongoing innovation in light device design. As technology continues to advance, we can expect even more exciting developments in the world of lighting.

When designing light devices, it's crucial to factor in the potential for fire accidents. While modern lighting technologies like LEDs are known for their energy efficiency and longevity, they are not immune to overheating and electrical faults, which can lead to fire hazards. Understanding and mitigating these risks is paramount to ensuring the safety of users and properties.

LEDs, like all electronic components, generate heat during operation. If not managed properly, this heat can accumulate and lead to device malfunction or even fire. Designing effective heat dissipation mechanisms, such as heat sinks or thermal conductive materials, is essential to prevent excessive heat build-up within the light device.

Utilizing fire-resistant materials in the construction of light devices is a critical step in fire prevention. Flame-retardant plastics and fire-resistant coatings can help delay the onset of a fire in case of a malfunction. These materials provide valuable time for users to detect the issue and take appropriate action before the situation escalates.

Light devices should be equipped with automatic safety features to detect overheating or electrical faults. These features can include temperature sensors, current limiters, and circuit breakers that activate when abnormal conditions are detected. By interrupting the electrical supply or reducing power output, these safeguards can prevent a minor issue from escalating into a major fire hazard.

In critical applications like industrial or commercial lighting, incorporating emergency shutdown mechanisms can be vital. These mechanisms can be activated remotely or automatically in response to fire alarms or abnormal temperature readings. They ensure that the light device is immediately powered down in case of a fire, minimizing the risk of further damage or injury.

Finally, light device manufacturers should subject their products to rigorous testing and certification processes to ensure they meet industry safety standards. Regulatory agencies often establish guidelines for fire safety in electrical devices. Compliance with these standards is not only a legal requirement but also a guarantee of product safety. By considering fire accidents and implementing these preventive measures, light device designers can contribute to safer and more reliable lighting solutions for all applications.

Light devices are an integral part of our daily lives, from the moment we wake up to when we go to sleep. They illuminate our homes, workplaces, streets, and countless other spaces. Given their ubiquitous presence, even minor improvements in light devices can have far-reaching impacts on our quality of life.

Designers are constantly driven to enhance the efficiency of light devices. This involves improving energy efficiency to reduce electricity consumption, thereby lowering utility bills and reducing our carbon footprint. LED technology, for instance, is a result of this relentless pursuit, offering a significantly more efficient alternative to traditional lighting sources.

Lighting isn't just about illumination; it's also about creating the right ambiance and mood. Designers understand that small refinements in light quality, color rendering, and dimming capabilities can greatly enhance the user experience. The ability to tailor lighting to specific needs, whether it's for relaxation, concentration, or aesthetics, contributes to our well-being and comfort.

Improvements in light devices extend beyond residential settings. In workplaces, hospitals, and public spaces, better lighting can enhance safety and productivity. High-quality lighting can reduce the risk of accidents, improve visibility, and create more conducive environments for work and recovery. Even subtle advancements in light technology can translate into significant improvements in these critical areas.

As society places a growing emphasis on sustainability, designers are also focused on making light devices more eco-friendly. From using recyclable materials in construction to designing fixtures that are easily upgradable and repairable, these sustainability-focused improvements not only benefit the environment but also promote responsible consumption.

In conclusion, designers are driven by the realization that even small improvements in light devices can yield substantial advantages for human life. Their relentless pursuit of efficiency, user experience enhancements, safety, productivity, and sustainability ensures that light devices continue to evolve, bringing about positive changes in how we illuminate our world and ultimately improving our overall quality of life. The evolution of lighting technology has been a fascinating journey through human history. From the early use of fire and candles to the advent of electric lighting, our quest for better and more efficient sources of light has never ceased. In recent decades, the development of LED (Light Emitting Diode) technology has revolutionized the world of lighting, offering a myriad of benefits and possibilities in various applications.

LED technology was born in the 1960s and has since come a long way. Initially, LEDs were used as indicator lights in electronic devices, but their potential for illumination was soon realized. Unlike traditional incandescent bulbs, LEDs emit light when an electric current passes through a semiconductor material. This fundamental difference led to a host of advantages, including energy efficiency, longevity, and design flexibility.

One of the most significant advantages of LED technology is its exceptional energy efficiency. LEDs convert a higher percentage of electrical energy into visible light, reducing energy consumption compared to traditional lighting sources. This efficiency not only saves electricity but also contributes to environmental sustainability by reducing carbon emissions.

LEDs have a much longer operational life compared to incandescent and fluorescent lights. The absence of fragile filaments or gases that can degrade over time means that LEDs can last for tens of thousands of hours. This longevity not only reduces the frequency of replacement but also lowers maintenance costs in various applications.

The versatility of LED technology has transformed the design of light devices. LEDs come in various colors and can be easily controlled to produce different levels of brightness and color temperatures. This flexibility has enabled designers to create innovative lighting solutions, from energy-efficient residential lighting to dynamic architectural lighting installations and even advanced automotive lighting systems.

Today, LED technology finds applications in almost every aspect of our lives. It illuminates our homes, offices, and streets, and it is used in display screens, traffic signals, and even medical devices. The adoption of LEDs continues to grow as we explore new ways to harness their benefits, making LED technology an integral part of our modern world and driving ongoing innovation in light device design. As technology continues to advance, we can expect even more exciting developments in the world of lighting.

When designing light devices, it's crucial to factor in the potential for fire accidents. While modern lighting technologies like LEDs are known for their energy efficiency and longevity, they are not immune to overheating and electrical faults, which can lead to fire hazards. Understanding and mitigating these risks is paramount to ensuring the safety of users and properties.

LEDs, like all electronic components, generate heat during operation. If not managed properly, this heat can accumulate and lead to device malfunction or even fire. Designing effective heat dissipation mechanisms, such as heat sinks or thermal conductive materials, is essential to prevent excessive heat build-up within the light device.

Utilizing fire-resistant materials in the construction of light devices is a critical step in fire prevention. Flame-retardant plastics and fire-resistant coatings can help delay the onset of a fire in case of a malfunction. These materials provide valuable time for users to detect the issue and take appropriate action before the situation escalates.

Light devices should be equipped with automatic safety features to detect overheating or electrical faults. These features can include temperature sensors, current limiters, and circuit breakers that activate when abnormal conditions are detected. By interrupting the electrical supply or reducing power output, these safeguards can prevent a minor issue from escalating into a major fire hazard.

In critical applications like industrial or commercial lighting, incorporating emergency shutdown mechanisms can be vital. These mechanisms can be activated remotely or automatically in response to fire alarms or abnormal temperature readings. They ensure that the light device is immediately powered down in case of a fire, minimizing the risk of further damage or injury.

Finally, light device manufacturers should subject their products to rigorous testing and certification processes to ensure they meet industry safety standards. Regulatory agencies often establish guidelines for fire safety in electrical devices. Compliance with these standards is not only a legal requirement but also a guarantee of product safety. By considering fire accidents and implementing these preventive measures, light device designers can contribute to safer and more reliable lighting solutions for all applications.

Light devices are an integral part of our daily lives, from the moment we wake up to when we go to sleep. They illuminate our homes, workplaces, streets, and countless other spaces. Given their ubiquitous presence, even minor improvements in light devices can have far-reaching impacts on our quality of life.

Designers are constantly driven to enhance the efficiency of light devices. This involves improving energy efficiency to reduce electricity consumption, thereby lowering utility bills and reducing our carbon footprint. LED technology, for instance, is a result of this relentless pursuit, offering a significantly more efficient alternative to traditional lighting sources.

Lighting isn't just about illumination; it's also about creating the right ambiance and mood. Designers understand that small refinements in light quality, color rendering, and dimming capabilities can greatly enhance the user experience. The ability to tailor lighting to specific needs, whether it's for relaxation, concentration, or aesthetics, contributes to our well-being and comfort.

Improvements in light devices extend beyond residential settings. In workplaces, hospitals, and public spaces, better lighting can enhance safety and productivity. High-quality lighting can reduce the risk of accidents, improve visibility, and create more conducive environments for work and recovery. Even subtle advancements in light technology can translate into significant improvements in these critical areas.

As society places a growing emphasis on sustainability, designers are also focused on making light devices more eco-friendly. From using recyclable materials in construction to designing fixtures that are easily upgradable and repairable, these sustainability-focused improvements not only benefit the environment but also promote responsible consumption.

In conclusion, designers are driven by the realization that even small improvements in light devices can yield substantial advantages for human life. Their relentless pursuit of efficiency, user experience enhancements, safety, productivity, and sustainability ensures that light devices continue to evolve, bringing about positive changes in how we illuminate our world and ultimately improving our overall quality of life. The evolution of lighting technology has been a fascinating journey through human history. From the early use of fire and candles to the advent of electric lighting, our quest for better and more efficient sources of light has never ceased. In recent decades, the development of LED (Light Emitting Diode) technology has revolutionized the world of lighting, offering a myriad of benefits and possibilities in various applications.

LED technology was born in the 1960s and has since come a long way. Initially, LEDs were used as indicator lights in electronic devices, but their potential for illumination was soon realized. Unlike traditional incandescent bulbs, LEDs emit light when an electric current passes through a semiconductor material. This fundamental difference led to a host of advantages, including energy efficiency, longevity, and design flexibility.

One of the most significant advantages of LED technology is its exceptional energy efficiency. LEDs convert a higher percentage of electrical energy into visible light, reducing energy consumption compared to traditional lighting sources. This efficiency not only saves electricity but also contributes to environmental sustainability by reducing carbon emissions.

LEDs have a much longer operational life compared to incandescent and fluorescent lights. The absence of fragile filaments or gases that can degrade over time means that LEDs can last for tens of thousands of hours. This longevity not only reduces the frequency of replacement but also lowers maintenance costs in various applications.

The versatility of LED technology has transformed the design of light devices. LEDs come in various colors and can be easily controlled to produce different levels of brightness and color temperatures. This flexibility has enabled designers to create innovative lighting solutions, from energy-efficient residential lighting to dynamic architectural lighting installations and even advanced automotive lighting systems.

Today, LED technology finds applications in almost every aspect of our lives. It illuminates our homes, offices, and streets, and it is used in display screens, traffic signals, and even medical devices. The adoption of LEDs continues to grow as we explore new ways to harness their benefits, making LED technology an integral part of our modern world and driving ongoing innovation in light device design. As technology continues to advance, we can expect even more exciting developments in the world of lighting.

When designing light devices, it's crucial to factor in the potential for fire accidents. While modern lighting technologies like LEDs are known for their energy efficiency and longevity, they are not immune to overheating and electrical faults, which can lead to fire hazards. Understanding and mitigating these risks is paramount to ensuring the safety of users and properties.

LEDs, like all electronic components, generate heat during operation. If not managed properly, this heat can accumulate and lead to device malfunction or even fire. Designing effective heat dissipation mechanisms, such as heat sinks or thermal conductive materials, is essential to prevent excessive heat build-up within the light device.

Utilizing fire-resistant materials in the construction of light devices is a critical step in fire prevention. Flame-retardant plastics and fire-resistant coatings can help delay the onset of a fire in case of a malfunction. These materials provide valuable time for users to detect the issue and take appropriate action before the situation escalates.

Light devices should be equipped with automatic safety features to detect overheating or electrical faults. These features can include temperature sensors, current limiters, and circuit breakers that activate when abnormal conditions are detected. By interrupting the electrical supply or reducing power output, these safeguards can prevent a minor issue from escalating into a major fire hazard.

In critical applications like industrial or commercial lighting, incorporating emergency shutdown mechanisms can be vital. These mechanisms can be activated remotely or automatically in response to fire alarms or abnormal temperature readings. They ensure that the light device is immediately powered down in case of a fire, minimizing the risk of further damage or injury.

Finally, light device manufacturers should subject their products to rigorous testing and certification processes to ensure they meet industry safety standards. Regulatory agencies often establish guidelines for fire safety in electrical devices. Compliance with these standards is not only a legal requirement but also a guarantee of product safety. By considering fire accidents and implementing these preventive measures, light device designers can contribute to safer and more reliable lighting solutions for all applications.

Light devices are an integral part of our daily lives, from the moment we wake up to when we go to sleep. They illuminate our homes, workplaces, streets, and countless other spaces. Given their ubiquitous presence, even minor improvements in light devices can have far-reaching impacts on our quality of life.

Designers are constantly driven to enhance the efficiency of light devices. This involves improving energy efficiency to reduce electricity consumption, thereby lowering utility bills and reducing our carbon footprint. LED technology, for instance, is a result of this relentless pursuit, offering a significantly more efficient alternative to traditional lighting sources.

Lighting isn't just about illumination; it's also about creating the right ambiance and mood. Designers understand that small refinements in light quality, color rendering, and dimming capabilities can greatly enhance the user experience. The ability to tailor lighting to specific needs, whether it's for relaxation, concentration, or aesthetics, contributes to our well-being and comfort.

Improvements in light devices extend beyond residential settings. In workplaces, hospitals, and public spaces, better lighting can enhance safety and productivity. High-quality lighting can reduce the risk of accidents, improve visibility, and create more conducive environments for work and recovery. Even subtle advancements in light technology can translate into significant improvements in these critical areas.

As society places a growing emphasis on sustainability, designers are also focused on making light devices more eco-friendly. From using recyclable materials in construction to designing fixtures that are easily upgradable and repairable, these sustainability-focused improvements not only benefit the environment but also promote responsible consumption.

In conclusion, designers are driven by the realization that even small improvements in light devices can yield substantial advantages for human life. Their relentless pursuit of efficiency, user experience enhancements, safety, productivity, and sustainability ensures that light devices continue to evolve, bringing about positive changes in how we illuminate our world and ultimately improving our overall quality of life.

SUMMARY

In some embodiments, a lighting apparatus includes a light source, a light housing, a light passing cover and a connector module.

The light source includes multiple LED modules.

The light housing has an internal container and a light opening.

The light source is placed inside the internal container.

A light of the multiple LED modules escapes from the light opening.

At least a portion of light housing is made with a plastic material mixed with an anti-fire material.

The anti-fire material increases a melting temperature for deformation of the light housing.

The light passing cover covers the light opening.

The light passing cover allows the light of the multiple LED modules to pass through.

The connector module has a fixing connector and an elastic unit.

The fixing connector is fixed to the light passing cover.

The elastic unit is used for fastening the light housing to an installation platform when no external force is applied on the elastic unit.

When an external force is applied on the elastic unit, the elastic unit changes a spanning diameter to release the light housing from the installation platform.

In some embodiments, the light housing is made of a single plastic structure via plastic molding.

In some embodiments, the portion of light housing made with a plastic material mixed with an anti-fire material is called an anti-fire part, wherein, in addition to the anti-fire part, the light housing has a normal part without the anti-fire material mixed.

In some embodiments, the lighting apparatus may also include a driver module.

The driver module is a separate from the light housing.

A power wire couples the light source and the driver module.

In some embodiments, the driver module is fixed to the installation platform so that even when the light housing is melt and falling down, the driver module drags the light housing to prevent the light housing falling down.

In some embodiments, the light source includes a light source plate mounted with LED modules.

The light source plate has a metal layer.

There is an auxiliary metal connector connecting the light source plate with the connector module so that even when the light housing is melt, the connector module is still holding the light source plate.

In some embodiments, the fixing connector has a central part and multiple claws extending from the central part.

In some embodiments, an emergent battery is used for supplying electricity to the light source when an emergency case occurs.

The emergent battery is separated from the driver module and is placed in a separate metal box.

In some embodiments, the lighting apparatus may also include a power electrode disposed the surface of the light housing for detachably attaching to an external device.

In some embodiments, the extending device is a night light source.

The night light source emits a smaller light intensity than the light source.

In some embodiments, the extending device has a storage device for storing an identifier data.

A driver module for generating a driving current for the light source receives the identifier data to determine how to control the extending device.

In some embodiments, the extending device has a wireless circuit to provide a wireless communication for the driver module.

In some embodiments, the lighting apparatus may also include a metal belt surrounding the light housing.

The metal belt captures the light housing even when the light housing is melt partly.

In some embodiments, the lighting apparatus may also include a dragging wire for fixing the light housing to the installation platform.

In some embodiments, the lighting apparatus may also include a safety net for capturing the light housing even when the light housing is melt.

In some embodiments, a detector is attached to the light housing and a driver module.

When the detector detects a deformation of the light housing larger than a threshold, the driver module issues a warning signal.

In some embodiments, the lighting apparatus may also include a magnet bracket fixed to the installation platform.

The light source is mounted on a light source bracket.

The light source bracket has a magnetic attraction force with the magnetic bracket.

In some embodiments, the connector module has a safety lock.

A part of the safety lock is exposed outside the light housing and the installation platform for a user to operate the safety lock to unlock the connector module to remove the light housing from the installation platform.

In some embodiments, the light housing has a lateral wall with multiple protruding ribs disposed on exterior surface of the lateral wall to increase the structure strength of the light housing to delay melt time when facing a fire accident.

In some embodiments, the light housing has a circular flat bottom cover and a lateral wall.

A diameter of the circular flat bottom cover is 10 times larger than a height of the lateral wall.

DETAILED DESCRIPTION

Figure 4:
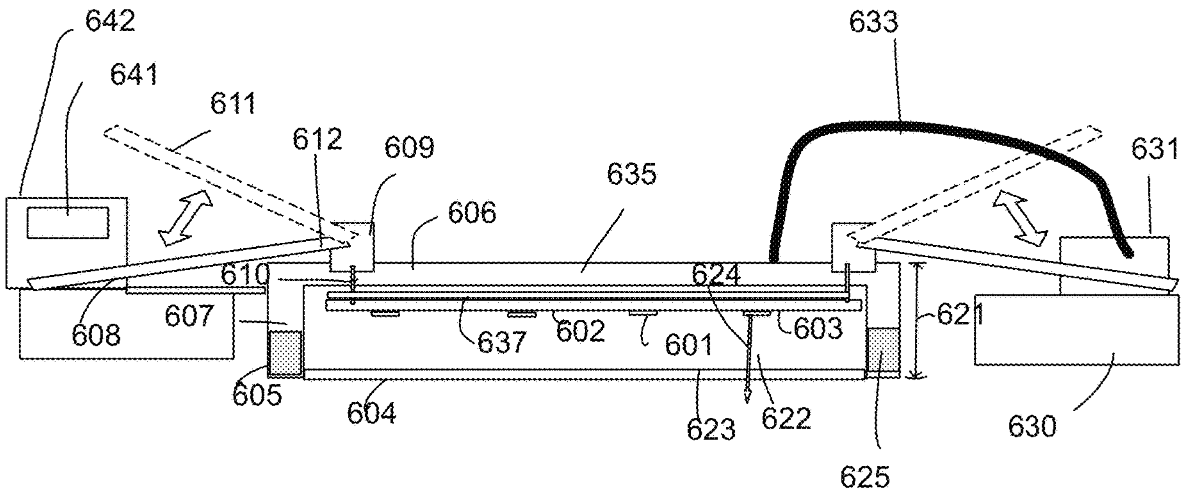
FIG. 4 illustrates a lighting apparatus embodiment.

In FIG. 4, a lighting apparatus includes a light source 602, a light housing 605, a light passing cover 604 and a connector module 612.

The light source includes multiple LED modules 601. These LED modules 601 may include different types of LED chips so that they can be controlled to mix different colors and/or different color temperatures.

The LED modules 601 are mounted on a light source plate 602. The light source plate may include a metal plate mounted with multiple layers for wiring. The metal plate is the thickest part and is good for performing heat dissipation and provides sufficient structural strength.

The light passing cover 604 may have multiple lenses corresponding to the positions of the multiple LED modules. In this embodiment, the light housing 605 has a circular flat bottom cover 606 and a lateral wall 607.

Figure 5:
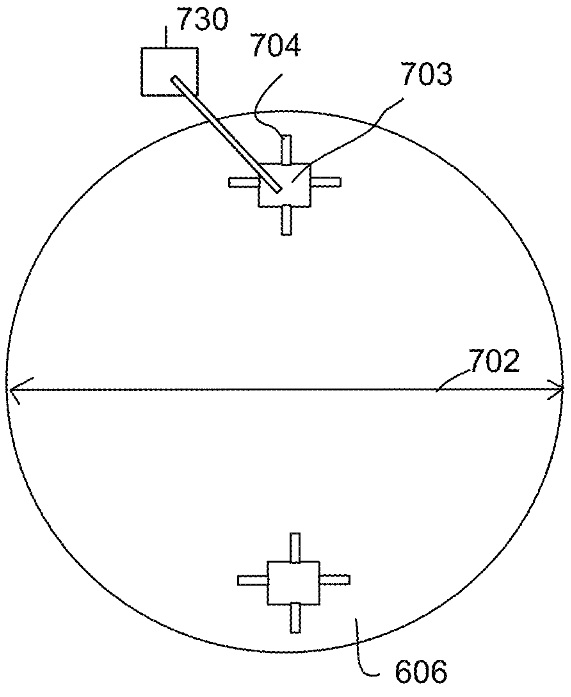
FIG. 5 shows a top view of the example in FIG. 4.

FIG. 5 shows a top view of the example of FIG. 4. In FIG. 5, the circular flat bottom cover 606 has a diameter 702.

In FIG. 4, the lateral wall 607 has a height 621. It has been tested that the diameter 702 of the diameter flat bottom cover 606 is preferably to be larger than 10 times of the height 621 of the lateral wall to increase a larger structural strength particularly in a fire accident.

The light housing 605 has an internal container 622 and a light opening 623.

The light source 603 is placed inside the internal container 622.

A light 624 of the multiple LED modules 601 is escaped from the light opening 623.

At least a portion of light housing 605 is made with a plastic material mixed with an anti-fire material. For example, there is an anti-fire part 625 that contains plastic material mixed with anti-fire material like follows.

Brominated Flame Retardants which compounds contain bromine, such as polybrominated diphenyl ethers (PBDEs) and tetrabromobisphenol A (TBBPA), are commonly used flame retardants. They can be added to plastics to reduce their flammability and increase their melting point.

Phosphorus-Based Flame Retardants which compounds contain phosphorus, like phosphates and phosphonates, are effective in improving the fire resistance of plastics. They work by releasing phosphoric acid when exposed to heat, which can inhibit the combustion process.

Aluminum Hydroxide (ATH) and Magnesium Hydroxide (MDH). These inorganic compounds are often used as flame retardants. When they are added to plastics, they release water vapor when heated, which helps cool down the material and suppress the fire.

Antimony Trioxide (ATO). Although it's not a standalone flame retardant, antimony trioxide is often used synergistically with other flame retardants. It can enhance the effectiveness of other flame-retardant compounds.

Melamine-Based Compounds. Melamine and melamine-based compounds can be used as flame retardants in plastics. They release nitrogen gas when exposed to heat, diluting oxygen and slowing down the combustion process.

Organophosphates. Organic compounds containing phosphorus can also serve as flame retardants. They can be added to plastics to increase their fire resistance.

The anti-fire material increases a melting temperature for deformation of the light housing.

The light passing cover 604 covers the light opening 623.

The light passing cover 604 allows the light 624 of the multiple LED modules 601 to pass through.

The connector module 612 has a fixing connector 609 and an elastic unit 608. The fixing connector 612 may include a screw of a rivet to be fixed to the light housing 605.

The fixing connector 609 is fixed to the light housing 605.

The elastic unit 608 is used for fastening the light housing 605 to an installation platform 630 when no external force is applied on the elastic unit 608, as the solid line of the elastic unit 608 demonstrates in the drawing.

When an external force is applied on the elastic unit, the elastic unit changes a spanning diameter to release the light housing from the installation platform. The dashed line of the elastic unit 611 shows that when an external force is applied to the elastic unit 608, the joint between the elastic unit 608 and the fixing connector 609, e.g. a spring, may be deformed so that the elastic unit 608 is rotated with respect to the fixing connector 609 to change the spanning diameter of the elastic unit 608.

In this example, there are two or three elastic units so as to provide robust support for fixing the light housing 605 to the installation platform 630, like a ceiling hole or a junction box for installing a light device.

In some embodiments, the light housing is made of a single plastic structure via plastic molding.

This is important because such manufacturing method creates a low-cost solution with high structural strength, which is particularly helpful to handling fire accident.

In some embodiments, the portion of a light housing made with a plastic material that is mixed with an anti-fire material is called an anti-fire part 625. In addition to the anti-fire part, the light housing has a normal part 635 without the anti-fire material mixed. In some design cases, the bottom part needs more robust structure and thus the anti-fire part is disposed at the portion of the light housing facing to the ground, where usually fire accident occurs.

In some other design requirements, the fire may occur from the ceiling tunnel. In such case, the anti-fire part may be moved to the back cover of the light housing, instead of the lateral wall as illustrated in FIG. 4.

Not only cost issue, some anti-fire material may influence heat dissipation. Therefore, it is useful if the light housing is made only a part of its component to contain anti-fire material.

In some embodiments, the lighting apparatus may also include a driver module 631.

The driver module 631 is a separate from the light housing 605.

A power wire 635 couples the light source and the driver module 631.

In some embodiments, the driver module 631 is fixed to the installation platform 630 so that even when the light housing 605 is melt and falling down, the driver module 631 drags the light housing 603 to prevent the light housing 603 falling down that may cause undesired damages.

In some embodiments, the light source 603 includes a light source plate 602 mounted with LED modules 601.

The light source plate 602 has a metal layer 637.

There is an auxiliary metal connector 610 connecting the light source plate 637 with the connector module 612 so that even when the light housing 605 is melt, the connector module 609 is still holding the light source plate 602.

In some embodiments, the fixing connector has a central part and multiple claws extending from the central part.

FIG. 5 shows that the fixing connector 703 having multiple claws 704 that have more contact points to more robustly capture the light housing 606. With such design, even a portion of the light housing is melt, other parts may still have connection between the connector module and the light housing, to increase safety level without spending too much cost.

In some embodiments, an emergent battery 641 is used for supplying electricity to the light source 603 when an emergency case occurs.

The emergent battery 641 is separated from the driver module 631 and is placed in a separate metal box 632 to prevent battery explosion that is particularly a bad thing in a fire accident.

In some embodiments, the lighting apparatus may also include a power electrode 806 disposed the surface of the light housing 802 for detachably attaching to an external device 801.

In some embodiments, the extending device 801 is a night light source, e.g. including multiple night light source module 803.

The night light source emits a smaller light intensity than the light source.

In some embodiments, the extending device 801 has a storage device 809 for storing an identifier data.

A driver module is used for a driving current for the light source to receive the identifier data to determine how to control the extending device 801.

For example, when the extending device 801 is attached to the light housing 801, their power electrodes 806, 807 are contacted to get power supply. Meanwhile, the control circuit may send power to the storage device 809, which may be a flash memory to retrieve the content of the identifier so that the controller knows what type of external device is now attached and chooses a different corresponding method to control the external device 801.

In some embodiments, the extending device has a wireless circuit 804 to provide a wireless communication for the driver module.

Figure 7:
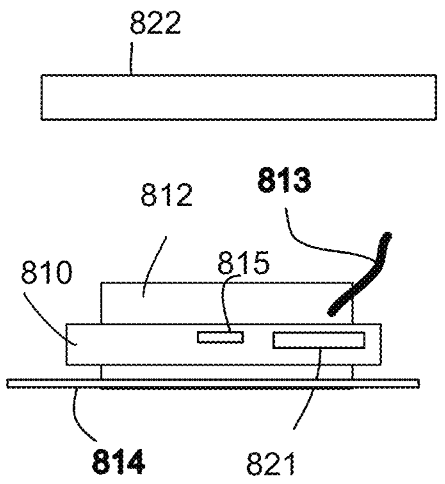
FIG. 7 shows another example to enhance structural strength of the light housing.

In FIG. 7, the lighting apparatus may also include a metal belt 810 surrounding the light housing 812. The metal belt may have multiple claws to robust support and fix the light housing 812 so that even when the plastic light housing is melt and deformed, the metal belt 810 still keep the light housing a certain shape, decreasing the risk for the light housing to fall down completely.

The metal belt captures the light housing even when the light housing is partly melt.

In some embodiments, the lighting apparatus may also include a dragging wire 813 for fixing the light housing 810 to the installation platform.

In some embodiments, the lighting apparatus may also include a safety net 814 for capturing the light housing even when the light housing is melt.

In some embodiments, a detector 815 is attached to the light housing and a driver module 812.

When the detector 815 detects a deformation of the light housing larger than a threshold, the driver module issues a warning signal. For example, the detector 815 may have a mechanical structure that changes its resistor value when it is deformed.

In some embodiments, the lighting apparatus may also include a magnet bracket 822 fixed to the installation platform.

The light source is mounted on a light source bracket 821.

The light source bracket 821 has a magnetic attraction force with the magnetic bracket 822.

In FIG. 5, the connector module has a safety lock 730.

A part of the safety lock is exposed outside the light housing and the installation platform for a user to operate the safety lock to unlock the connector module to remove the light housing from the installation platform. For example, a lever connects a push button form the safety lock. If the push button is not pressed, the connector module is locked with some structure, e.g. a pin. When the push button is pressed, the safety lock is unlocked and at this time, the light housing is removable from the installation platform.

Figure 6:
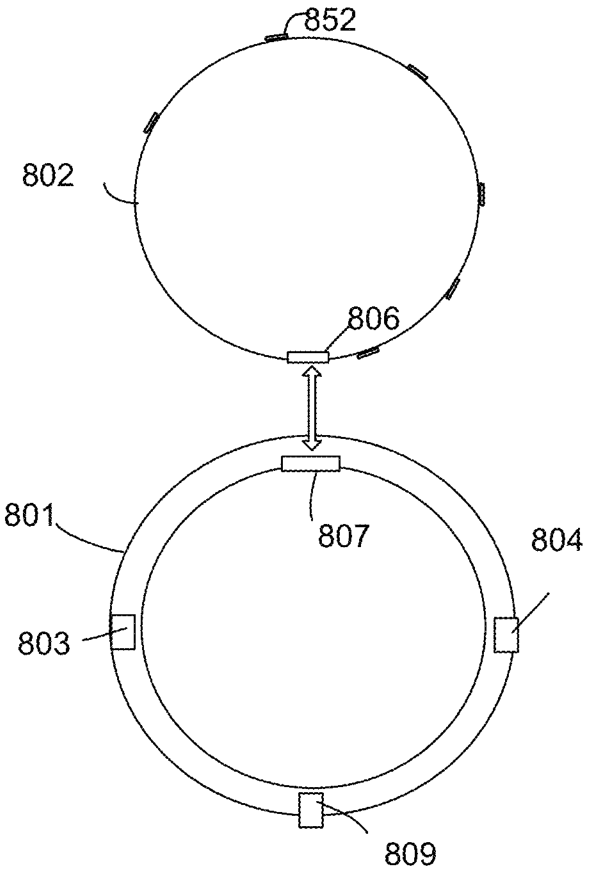
FIG. 6 shows another example attaching an external device.

In FIG. 6, the light housing has a lateral wall with multiple protruding ribs 852 disposed on exterior surface of the lateral wall to increase the structure strength of the light housing to delay melt time when facing a fire accident.

In some embodiments, the light housing has a circular flat bottom cover and a lateral wall.

A diameter of the circular flat bottom cover is 10 times larger than a height of the lateral wall.

Figure 1:
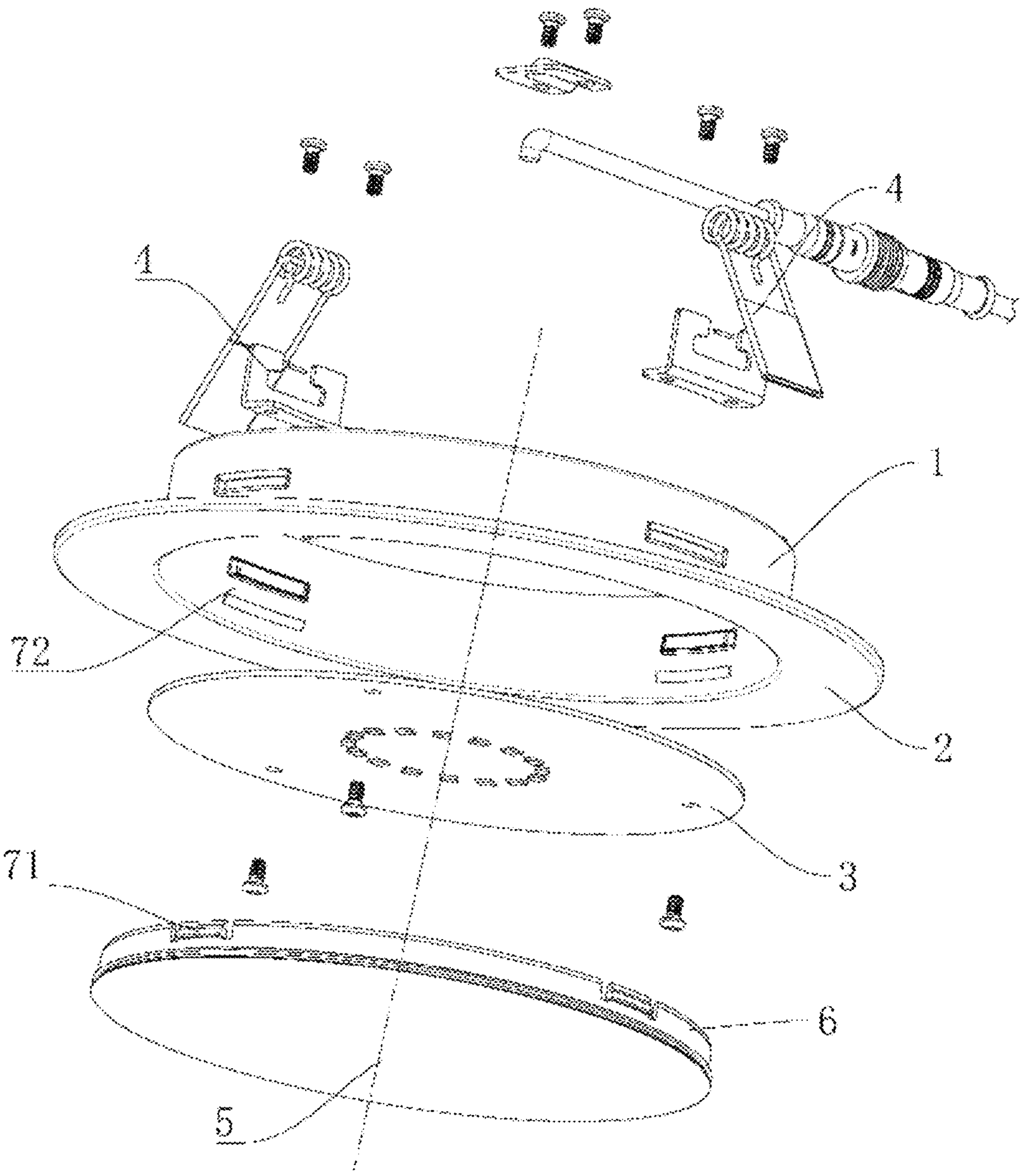
FIG. 1 is an exploded view of a lighting apparatus that has strong structural strength.
Figure 2:
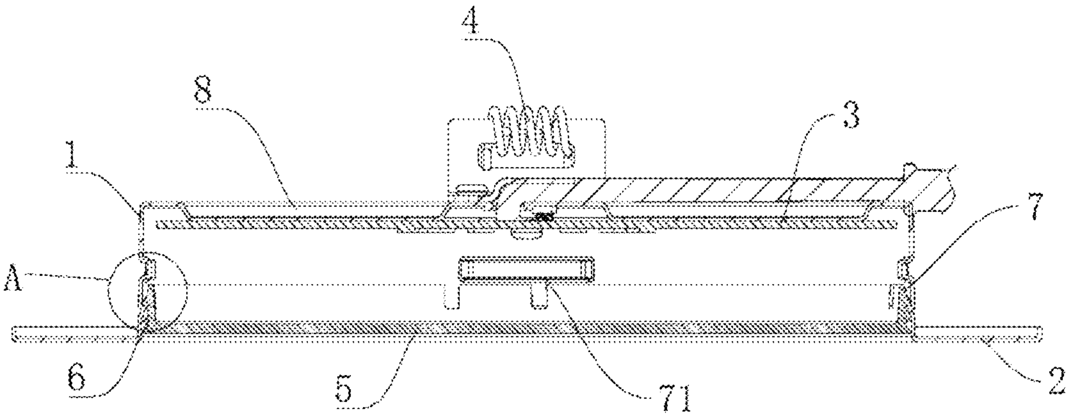
FIG. 2 is a cross-sectional view of the example in FIG. 1.
Figure 3:
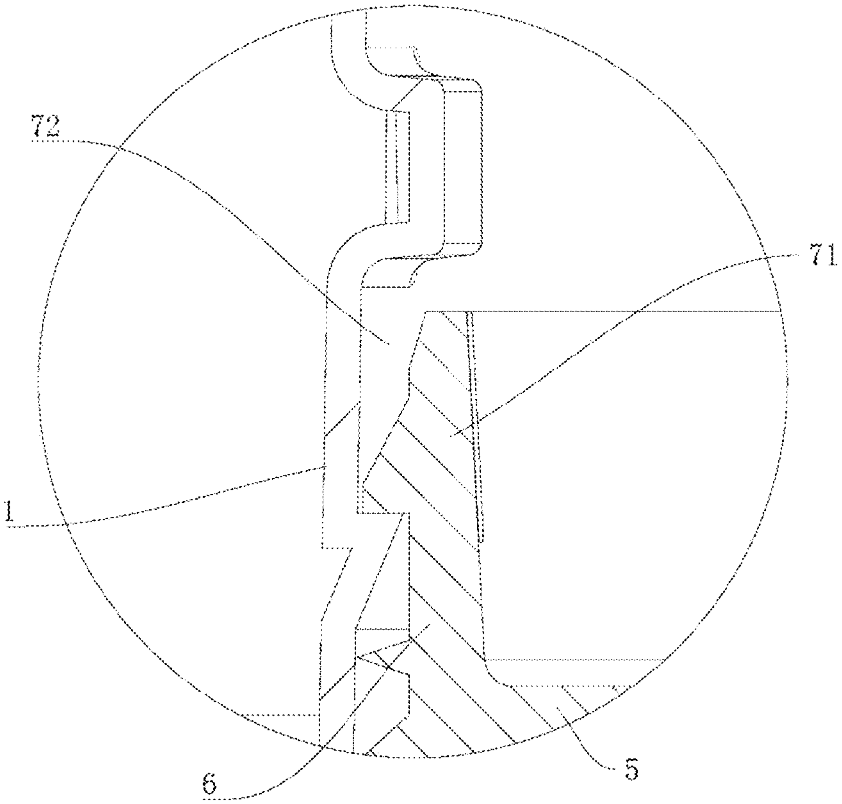
FIG. 3 is a zoom-up view of a connection structure of the example in FIG. 2.

Please refer to FIG. 1 to FIG. 3. FIG. 1 is an exploded view of a lighting apparatus that has strong structural strength. FIG. 2 is a cross-sectional view of the example in FIG. 1. FIG. 3 is a zoom-up view of a connection structure of the example in FIG. 2.

FIG. 1 to FIG. 3 show another lighting apparatus embodiment.

In FIG. 1 to FIG. 3, the lighting apparatus has a light passing cover 6 with multiple buckles 71 that have reverse hooks and matching grooves 72 at inner side of the light housing 1. There is a surface rim 2 protruding to cover the hole of the installation platform. There is a light source 3 with a light source plate and LED modules disposed on the light source plate.

The components are assembled along a center line, which shows a light opening 5 where light is passed through. There are two connector modules 4 disposed on the bottom cover the light housing 1.

In FIG. 2, a back cover 8 faces to an installation platform and there is a connection structure between the light passing cover 6 and the light housing 1.

FIG. 3 shows a reverse hook 71 matching a groove 72 for firmly fixing the light passing cover 6 to the light housing 1. To make such connection, it makes falling risk lower than previous design. It also prevents water to go into the container of the light housing to damage the light source.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The light housing 605 has an internal container 622 and a light opening 623.

The light source 603 is placed inside the internal container 622.

A light 624 of the multiple LED modules 601 escapes from the light opening 623.

At least a portion of light housing 605 is made with a plastic material mixed with an anti-fire material. For example, there are anti-fire part 625 that contains plastic material mixed with anti-fire material like follows:

Brominated Flame Retardants: Compounds containing bromine, such as polybrominated diphenyl ethers (PBDEs) and tetrabromobisphenol A (TBBPA), are commonly used flame retardants. They can be added to plastics to reduce their flammability and increase their melting point.

Phosphorus-Based Flame Retardants: Compounds containing phosphorus, like phosphates and phosphonates, are effective in improving the fire resistance of plastics. They work by releasing phosphoric acid when exposed to heat, which can inhibit the combustion process.

Aluminum Hydroxide (ATH) and Magnesium Hydroxide (MDH): These inorganic compounds are often used as flame retardants. When they are added to plastics, they release water vapor when heated, which helps cool down the material and suppress the fire.

Antimony Trioxide (ATO): Although it's not a standalone flame retardant, antimony trioxide is often used synergistically with other flame retardants. It can enhance the effectiveness of other flame-retardant compounds.

Melamine-Based Compounds: Melamine and melamine-based compounds can be used as flame retardants in plastics. They release nitrogen gas when exposed to heat, diluting oxygen and slowing down the combustion process.

Organophosphates: Organic compounds containing phosphorus can also serve as flame retardants. They can be added to plastics to increase their fire resistance.

The anti-fire material increases a melting temperature for deformation of the light housing.

The light passing cover 604 covers the light opening 623.

The invention claimed is:

1. A lighting apparatus, comprising:
   - a light source, wherein the light source comprises multiple LED modules;
   - a light housing, wherein the light housing has an internal container and a light opening, wherein the light source is placed inside the internal container, wherein a light of the multiple LED modules escapes from the light opening, wherein at least a portion of the light housing is made with a plastic material mixed with an anti-fire material, wherein the anti-fire material increases a melting temperature for deforming the light housing;
   - a light passing cover for covering the light opening, wherein the light passing cover allows the light of the multiple LED modules to pass through; and
   - a connector module with a fixing connector and an elastic unit, wherein the fixing connector is fixed to the light housing, wherein the elastic unit is used for fastening the light housing to an installation platform when no external force by a user is applied on the elastic unit, wherein when an external force by a user for detaching the lighting apparatus from the installation platform is applied on the elastic unit, the elastic unit changes a spanning diameter to release the light housing from the installation platform, wherein the light source comprises a light source plate mounted with LED modules, wherein the light source plate has a metal layer, wherein there is an auxiliary metal connector connecting the light source plate with the connector module so that even when the light housing is melt, the connector module is still holding the light source plate.

2. The lighting apparatus of claim 1, wherein the light housing is made of a single plastic structure via plastic molding.

3. The lighting apparatus of claim 1, wherein the portion of light housing made with a plastic material mixed with an anti-fire material is called an anti-fire part, wherein, in addition to the anti-fire part, the light housing has a normal part without the anti-fire material mixed.

4. The lighting apparatus of claim 1, further comprising a driver module, wherein the driver module is a separate from the light housing, wherein a power wire couples the light source and the driver module.

5. The lighting apparatus of claim 4, wherein the driver module is fixed to the installation platform so that even when the light housing is melt and falling down, the driver module drags the light housing to prevent the light housing falling down.

6. The lighting apparatus of claim 4, wherein an emergent battery is used for supplying electricity to the light source when an emergency case occurs, wherein the emergent battery is separated from the driver module and is placed in a separate metal box.

7. The lighting apparatus of claim 1, wherein the fixing connector has a central part and multiple claws extending from the central part.

8. The lighting apparatus of claim 1, further comprising a power electrode disposed the surface of the light housing for detachably attaching to an extending device.

9. The lighting apparatus of claim 8, wherein the extending device is a night light source, wherein the night light source emits a smaller light intensity than the light source.

10. The lighting apparatus of claim 8, wherein the extending device has a storage device for storing an identifier data, wherein a driver module for generating a driving current for the light source receives the identifier data to determine how to control the extending device.

11. The lighting apparatus of claim 10, wherein the extending device has a wireless circuit to provide a wireless communication for the driver module.

12. The lighting apparatus of claim 1, further comprising a metal belt surrounding the light housing, wherein the metal belt captures the light housing even when the light housing is partly melt.

13. The lighting apparatus of claim 1, further comprising a dragging wire for fixing the light housing to the installation platform.

14. The lighting apparatus of claim 1, further comprising a safety net for capturing the light housing even when the light housing is melt.

15. The lighting apparatus of claim 1, wherein a detector is attached to the light housing and a driver module, wherein when the detector detects a deformation of the light housing larger than a threshold, the driver module issues a warning signal.

16. The lighting apparatus of claim 1, further comprising a magnet bracket fixed to the installation platform, wherein the light source is mounted on a light source bracket, wherein the light source bracket has a magnetic attraction force with the magnetic bracket.

17. The lighting apparatus of claim 1, wherein the connector module has a safety lock, wherein a part of the safety lock is exposed outside the light housing and the installation platform for a user to operate the safety lock to unlock the connector module to remove the light housing from the installation platform.

18. The lighting apparatus of claim 1, wherein the light housing has a lateral wall with multiple protruding ribs disposed on exterior surface of the lateral wall to increase the structure strength of the light housing to delay melt time when facing a fire accident.

19. The lighting apparatus of claim 1, wherein the light housing has a circular flat bottom cover and a lateral wall, wherein a diameter of the circular flat bottom cover is 10 times larger than a height of the lateral wall.

* * * * *